Sept. 30, 1958 H. FRIESS 2,854,528
COMBINED SOUND FILM AND TELEVISION APPARATUS
Filed Feb. 9, 1954
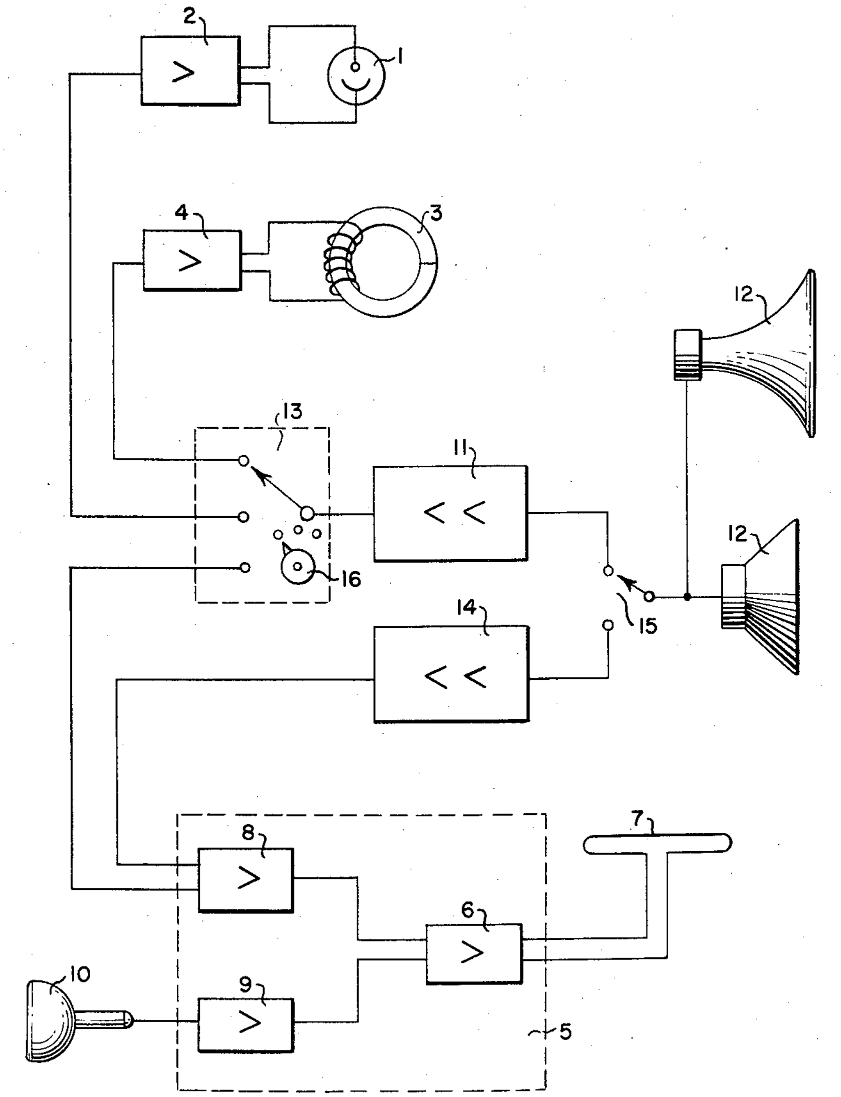
INVENTOR
HANS FRIESS
BY
ATTORNEY

United States Patent Office 2,854,528

Patented Sept. 30, 1958

2,854,528

COMBINED SOUND FILM AND TELEVISION APPARATUS

Hans Friess, Karlsruhe-Daxlanden, Germany, assignor to Siemens & Halske, Aktiengesellschaft, Munich and Berlin, Germany, a German corporation Application February 9, 1954, Serial No. 409,212

Claims priority, application Germany February 12, 1953

1 Claim. (Cl. 179—100.11)

This invention relates to combined sound film and television apparatus and is particularly concerned with a sound film reproducer for selective use in the playing of optical sound films or magnetic sound films or television productions, respectively, in motion picture theatres or the like.

In order to reduce the expenditures in equipment such as amplifiers, loudspeakers, and the like, the invention proposes to provide at least one common loudspeaker and if desired also a common sound amplifier for the playing of optical films and/or magnetic films as well as for sound accompaniment for television productions, and to provide a switching device for selectively switching such loudspeaker and sound amplifier for coaction with the scanning device for the optical film, or with the magnetic reproduce head or for coaction with the television receiver apparatus.

The switching device according to the invention makes it possible to utilize the sound reproducer equipment which is, e. g., available in a motion picture theater, for the playing of optical sound films and/or magnetic sound films and to utilize amateur narrow film equipment for the sound accompaniment in television playing. The switching device is suitably built into the sound film reproducer apparatus.

The invention may be practiced so that the output of separate preamplifiers for the optical film scanning device and for the magnetic reproduce head and for the television receiver, respectively, can be selectively connected with the input of a common principal amplifier coacting with loudspeakers.

The invention may also provide a common principal amplifier for optical sound film playing and/or for magnetic sound film reproduction and a separate principal amplifier for the television playing, and a switching device for selectively connecting the loudspeaker with one or the other of the two principal amplifiers.

In accordance with another feature of the invention the amplifiers of sound channels not in use are blocked by the switching device incident to the actuation thereof for operatively connecting a certain channel. For example, the magnetic sound channel and the optical sound channel are blocked, e. g., shunted, during television playing.

The invention provides means adapted to adjust or to regulate the input sensitivity of the common principal amplifier automatically to the different sensitivities of the individual sound channels so as to obtain proper coaction in case of different output voltages of the magnetic sound device and the television receiver. A special switch may be provided in the previously mentioned switching device or at another suitable place for adjusting or regulating the sensitivity stages by approximating the principal amplifier to the level of the three sound channels.

Details will now be described with reference to the accompanying drawing showing a simplified circuit diagram of combination sound reproducer apparatus according to the invention.

The apparatus shows the photocell 1 of an optical film scanner device, a preamplifier 2 coacting therewith, and the magnetic sound reproduce head 3 with associated preamplifier 4. Numeral 5 indicates the television receiver comprising the common input portion 6 for the picture and the sound, the antenna 7, sound receiver or control portion 8, picture receiver portion 9 and the tube 10. The tube 10 may be formed as a projection tube. In addition, the sound equipment comprises the principal amplifier 11 and the loudspeakers 12. One of these loudspeakers may be for the low frequency range and the other for the high frequency range.

The switching device 13 has three positions for switching the common principal amplifier 11 with the associated loudspeakers 12 to establish connection selectively, with the photocell 1, magnetic head 3 and the television sound control portion 8, respectively.

The apparatus may be modified by the provision of a separate principal amplifier 14 for the sound accompanying the television production. A switch 15 is in such case provided for selectively connecting the loudspeakers 12 with the principal amplifier 11, for film playing, and with the principal amplifier 14, for television playing, respectively.

A special three position sensitivity regulator or adjusting switch 16 may be provided in conjunction with the switching device 13 for the purpose of approximating the sensitivity of the amplifier 11 to the level of the individual channels simultaneously with connecting such amplifier with the respective channels. The sensitivity regulator 16 may be suitably coupled with the shaft of the switch 13 for coaction therewith.

The sensitivity regulator may be eliminated by the provision of corresponding adjusting or regulating means in the input circuits respectively extending from the three stationary contacts of the switch 13 so as to bring the voltages in all these circuits to the same value.

Suitable means may be provided, including, e. g., a further switching segment on the switch 13, for blocking any two sound channels, e. g., shunting such channels upon operatively connecting a channel that is to be used for playing.

What is believed to be new and desired to have protected by Letters Patent is defined in the appended claim.

I claim:

A combined sound film and television apparatus having an optical device including an optical sound film, a magnetic device including a magnetic sound film, and a television device including a sound receiver, respective preamplifiers for said sound films, said apparatus comprising at least one common loudspeaker for reproducing the sound from said films and television sound receiver, a pair of principal amplifiers for coaction with said loudspeaker, one of said amplifiers being common to said sound film preamplifiers, and the other amplifier being cooperable with the sound receiver of said television device, a switching device for selectively connecting either of said sound film preamplifiers with the principal amplifier associated therewith, and switching means for operatively connecting either of said amplifiers to said loudspeaker.

References Cited in the file of this patent

UNITED STATES PATENTS

| | | |
|---|---|---|
| 2,557,245 | Zillger | June 19, 1951 |
| 2,610,251 | Torsch | Sept. 9, 1952 |

FOREIGN PATENTS

| | | |
|---|---|---|
| 699,779 | France | Feb. 19, 1931 |